(12) United States Patent
Iwasaki

(10) Patent No.: US 12,279,042 B2
(45) Date of Patent: Apr. 15, 2025

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventor: Naoki Iwasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/452,198

(22) Filed: Aug. 18, 2023

(65) Prior Publication Data

US 2024/0073522 A1    Feb. 29, 2024

(30) Foreign Application Priority Data

Aug. 24, 2022  (JP) ................. 2022-133519

(51) Int. Cl.
*H04N 23/67* (2023.01)
*H04N 23/61* (2023.01)

(52) U.S. Cl.
CPC ........... *H04N 23/675* (2023.01); *H04N 23/61* (2023.01); *H04N 23/672* (2023.01)

(58) Field of Classification Search
CPC .... H04N 23/675; H04N 23/61; H04N 23/672; H04N 23/611
See application file for complete search history.

(56) References Cited

U.S. PATENT DOCUMENTS

2021/0366131 A1* 11/2021 Matsuda ................. H04N 23/60
2022/0408027 A1* 12/2022 Sasaki .................... H04N 23/60

FOREIGN PATENT DOCUMENTS

| JP | 5761984 B2 | 8/2015 |
| JP | 2021-176009 A | 11/2021 |
| JP | 2021173803 A | 11/2021 |

OTHER PUBLICATIONS

The above Foreign Patent Document was cited in a Japanese Office Action that issued on Sep. 6, 2024, which is enclosed, with a machine translation, that issued in the corresponding Japanese Patent Application No. 2022-133519.

* cited by examiner

*Primary Examiner* — Shahbaz Nazrul
(74) *Attorney, Agent, or Firm* — Cowan, Liebowitz & Latman, P.C.

(57) ABSTRACT

An image capturing apparatus includes an object detection unit configured to detect an object from an image signal, a discriminating unit configured to discriminate a type of the object, a setting unit configured to set a focus detection region divided in a plurality of sub-regions corresponding to the region of the object, a focus detection unit configured to detect information about an in-focus position for each of the plurality of sub-regions, a prediction unit configured to predict an in-focus position according to a movement of the object in a depth direction, and a selection unit configured to select an in-focus position of which sub-region among the plurality of sub-regions to employ as the in-focus position of the object, in accordance with the type of the object and the in-focus position being predicted.

14 Claims, 13 Drawing Sheets

F I G. 4A
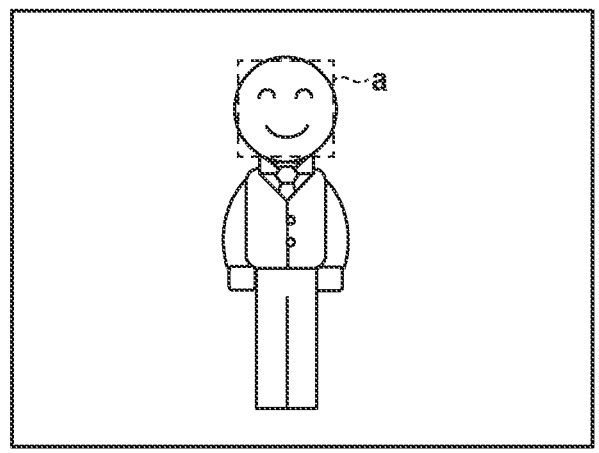
F I G. 4B
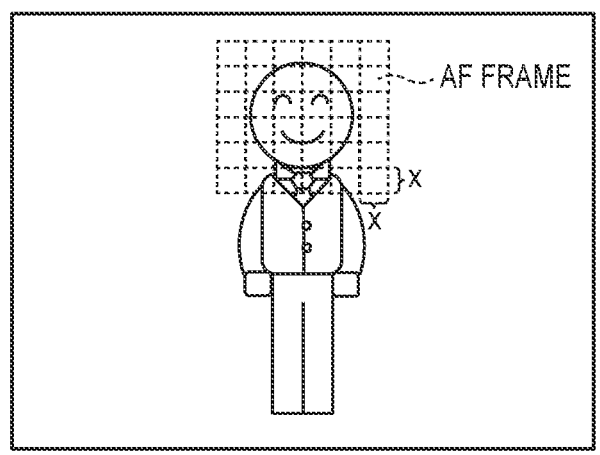

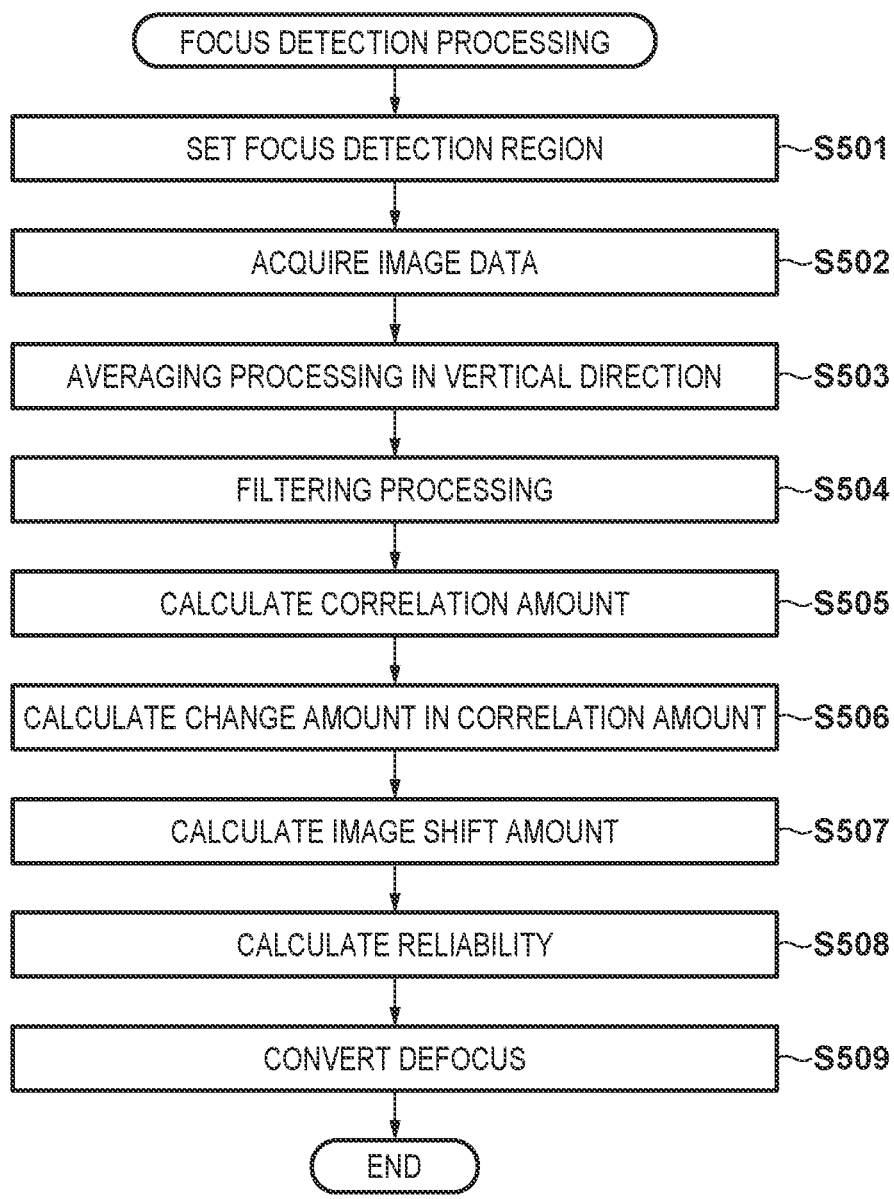

FIG. 10A

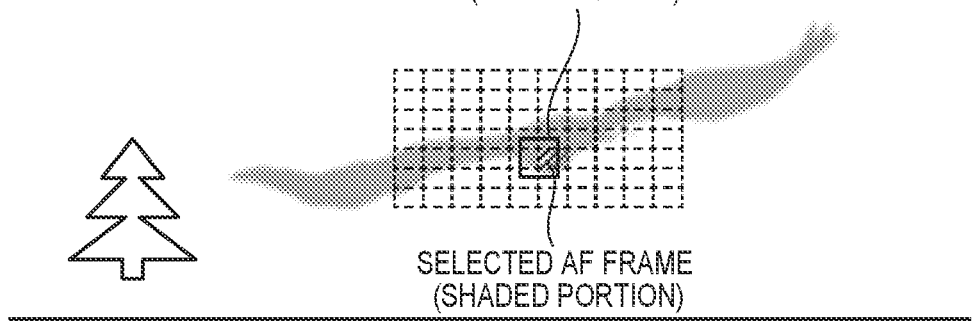
FACE DETECTION FRAME OF BIRD (SOLID SQUARE)
SELECTED AF FRAME (SHADED PORTION)

↓ MAKE HISTOGRAM

PREDICTED POSITION OF PREVIOUS MAIN FRAME
TOTAL NUMBER OF AF FRAMES FORMING PEAK IS PREDETERMINED VALUE OR MORE
OBJECT (BIRD)
BACKGROUND (TREE)
HISTOGRAM COUNT THRESHOLD VALUE
INFINITY
CLOSEST DISTANCE
REGION INCLUDING BACKGROUND COMPONENT
FACE AND PUPIL OF BIRD
WING AND BODY OF BIRD
HISTOGRAM GENERATION RANGE

F I G. 10B
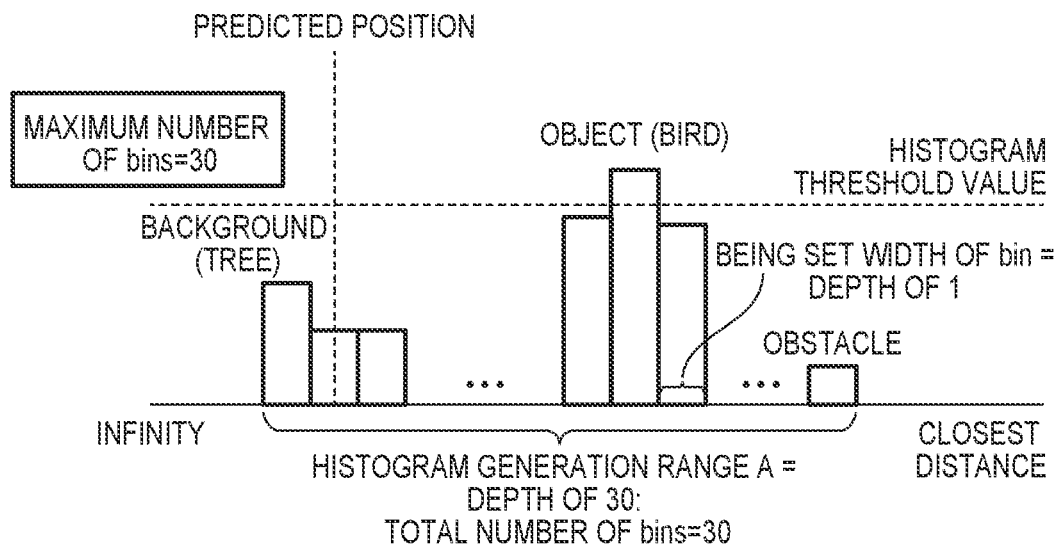
F I G. 10C
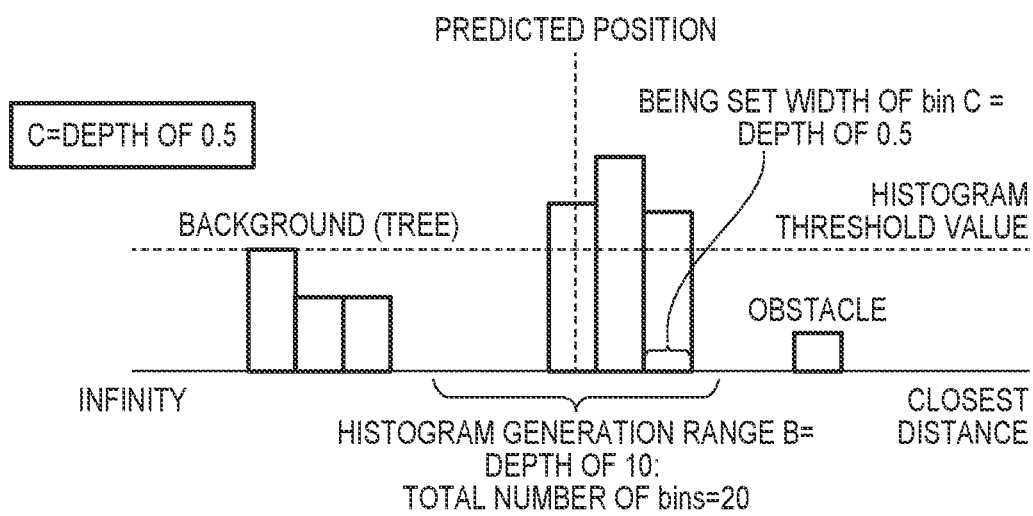

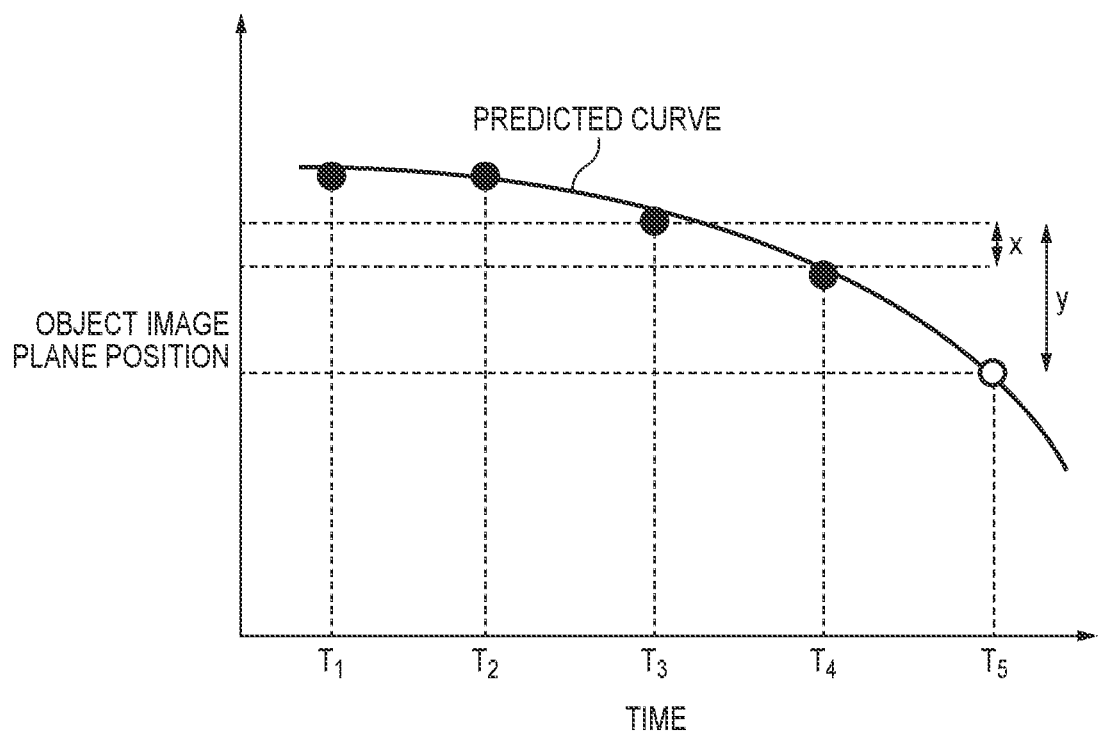

IMAGE CAPTURING APPARATUS, CONTROL METHOD THEREOF, AND STORAGE MEDIUM

BACKGROUND OF THE INVENTION

Field of the Invention

The present invention relates to an image capturing apparatus configured to perform focusing according to a phase-difference detection method using output signals from an image sensor.

Description of the Related Art

In recent years, various automatic focusing methods (AF method) have been put to practical use, such as an image plane phase difference AF method or a contrast AF method that uses an image sensor. Furthermore, there is known, in the various AF methods, a technique for identifying and focusing a region of a main object.

Japanese Patent Laid-Open No. 2021-176009 discloses performing a control in which a histogram of defocus amounts for a plurality of AF frames are generated and a main frame is selected therefrom. In addition, Japanese Patent No. 5761984 discloses that a plurality of AF frames in an object is generated, and the accuracy of identifying the main object region is improved.

However, in Japanese Patent Laid-Open No. 2021-176009 and Japanese Patent No. 5761984, motion of the object is not predicted, and thus focus tracking cannot catch up with motion of the object. In addition, a desired result may not be obtained in a case where regions at the infinite distance side and the minimum-object-distance side coexist in a single AF frame when back focus occurs.

SUMMARY OF THE INVENTION

The present invention is made in view of the aforementioned problems and realizes a good focusing operation even when a far region and a near region coexist in the object region.

According to a first aspect of the present invention, there is provided an image capturing apparatus comprising: at least one processor or circuit configured to function as: an object detection unit configured to detect an object from an image signal obtained by an image sensor; a discriminating unit configured to discriminate a type of the object being detected; a setting unit configured to set a focus detection region divided in a plurality of sub-regions corresponding to the region of the object being detected; a focus detection unit configured to detect information about an in-focus position for each of the plurality of sub-regions; a prediction unit configured to predict an in-focus position according to a movement of the object in a depth direction; and a selection unit configured to select an in-focus position of which sub-region among the plurality of sub-regions to employ as the in-focus position of the object, in accordance with the type of the object and the in-focus position being predicted.

According to a second aspect of the present invention, there is provided a method of controlling an image capturing apparatus comprising: detecting an object from an image signal obtained by an image sensor; discriminating a type of the object being detected; setting a focus detection region divided in a plurality of sub-regions corresponding to the region of the object being detected; detecting information about an in-focus position for each of the plurality of sub-regions; predicting an in-focus position according to a movement of the object in a depth direction; and selecting an in-focus position of which sub-region among the plurality of sub-regions to employ as the in-focus position of the object, in accordance with the type of the object and the in-focus position being predicted.

Further features of the present invention will become apparent from the following description of exemplary embodiments with reference to the attached drawings.

BRIEF DESCRIPTION OF THE DRAWINGS

FIGS. 4A and 4B are diagrams illustrating a concept of a detection region for a person's face;

FIG. 8 is a flowchart describing focus detection processing;

FIG. 10A is a conceptual diagram of a histogram;

FIG. 10B is a conceptual diagram of a histogram;

FIG. 10C is a conceptual diagram of a histogram; and

FIG. 11 is a diagram illustrating a concept of motion prediction.

DESCRIPTION OF THE EMBODIMENTS

Figure 1:
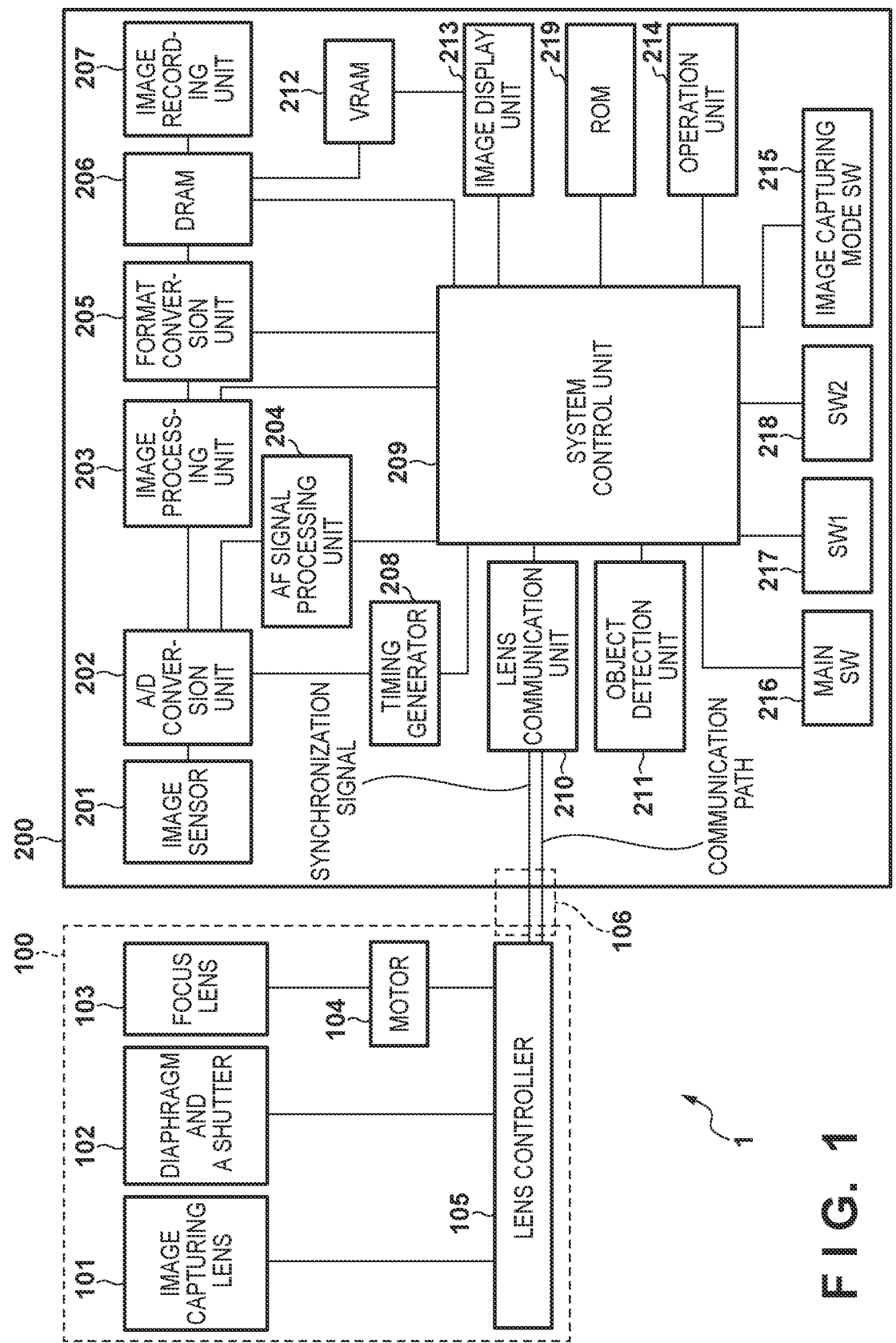
FIG. 1 is a block diagram illustrating a configuration of a lens interchangeable camera, according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Image Capturing Apparatus

FIG. 1 is a block diagram illustrating a configuration of a lens interchangeable camera (simply referred to as camera in the following) according to an embodiment of the present invention. The camera according to the present embodiment, which is an example of an image capturing apparatus applying the present invention, can perform focusing by an image plane phase difference detection method using output signals from an image sensor that captures an image of an object.

A camera 1 includes a lens apparatus (interchangeable lens) 100 and a camera body 200. The lens apparatus 100 is mounted on the camera body 200 via a lens mount (not illustrated) including an electric contact unit 106. When the lens apparatus 100 is mounted on the camera body 200, a lens controller 105 that performs integrated control of the operation of the lens apparatus 100 and a system control unit 209 that performs integrated control of the operation of the camera 1 as a whole can communicate with each other via the electric contact unit 106.

First, the configuration of the lens apparatus 100 will be described. The lens apparatus 100 includes an image capturing lens 101 including a zoom mechanism, a diaphragm and a shutter 102 configured to control light amount, a focus lens 103 configured to focus on an image sensor 201, a motor 104 configured to drive a focus lens 103, and a lens controller 105.

Next, the configuration of the camera body 200 will be described. The camera body 200 is configured such that image capturing signals (image signals) can be acquired from a light flux that has passed through an image capturing optical system of the lens apparatus 100. The camera body 200 includes the image sensor 201 configured to convert reflected light from an object into an electric signal, an A/D conversion unit 202 including a CDS circuit that removes output noise of the image sensor 201 and a nonlinear amplification circuit that performs before A/D conversion, an image processing unit 203, and an auto-focus (AF) signal processing unit 204. In addition, the camera body 200 includes a format conversion unit 205, a high-speed built-in memory (for example, a random access memory or the like, referred to as DRAM in the following) 206, and an image recording unit 207 including a recording medium such as a memory card and an interface of the recording medium. In addition, the camera body 200 includes a timing generator 208, the system control unit 209 that controls the camera 1 as a whole, a lens communication unit 210 that performs communication between the camera body 200 and the lens apparatus 100, an object detection unit 211, and a memory for image display (VRAM, in the following) 212. The system control unit 209 executes a program stored in a non-volatile memory (ROM, in the following) 219 to control the camera 1 as a whole.

In addition, the camera body 200 includes an image display unit 213 that displays, in addition to displaying images, a display of an operation assistance, a display of a camera state, an image capturing screen and a focus detection region at the time of shooting, or the like. In addition, the camera 1 includes an operation unit 214 configured to operate the camera body 200 from outside, an image capturing mode switch 215 configured to select an image capturing mode such as a macro mode or a sport mode, and a main switch 216 configured to power on the camera 1.

In addition, the camera 1 includes a switch (SW1, in the following) 217 that is turned on by half-pressing a release button to perform an image capturing standby operation such as auto-focus or automatic focusing (AF), automatic exposure control (AE), and an image capturing switch (SW2, in the following) 218 that is turned on by full-pressing the release button to perform image capturing after operating the SW1.

The DRAM 206 is used, for example, as a high-speed buffer configured to temporarily store an image or as a work memory in compressing/decompressing an image. The operation unit 214 includes following items, for example. That is a menu switch configured to perform various settings such as settings of image capturing functions and settings for image reproduction of the camera 1, and an operation mode switching switch configured to switch between the image capturing mode and the reproduction mode.

The image sensor 201 includes a CCD or a CMOS sensor. Each pixel of the image sensor 201 used in the present embodiment is configured by including two (a pair of) photodiodes A and B, and a microlens provided for the pair of photodiodes A and B. Each pixel divides incident light with a microlens to form a pair of optical images on the pair of photodiodes A and B, and outputs, from the pair of photodiodes A and B, a pair of pixel signals (signal A and signal B) used for AF signals described below. In addition, signals for image capturing (image signals, signals A+B) can be obtained by adding the outputs from the pair of photodiodes A and B.

By respectively combining a plurality of signals A and a plurality of signals B output from a plurality of pixels, a pair of image signals as AF signals (in other words, signals for focus detection) is obtained, which is used for AF by image plane phase difference detection method (referred to as image plane phase-difference AF, in the following). The AF signal processing unit 204 performs correlation calculation on the pair of image signals to calculate a phase difference (referred to as image shift amount, in the following) that is a shift amount of the pair of image signals, and further calculates, from the image shift amount, a defocus amount (and a defocus direction and reliability) of the image capturing optical system. In addition, the AF signal processing unit 204 calculates the defocus amount in each of a plurality of predetermined regions that has been designated.

Operation of Image Capturing Apparatus

In the following, an operation of the image capturing apparatus according to the present embodiment will be described, referring to FIG. 2.

Figure 2:
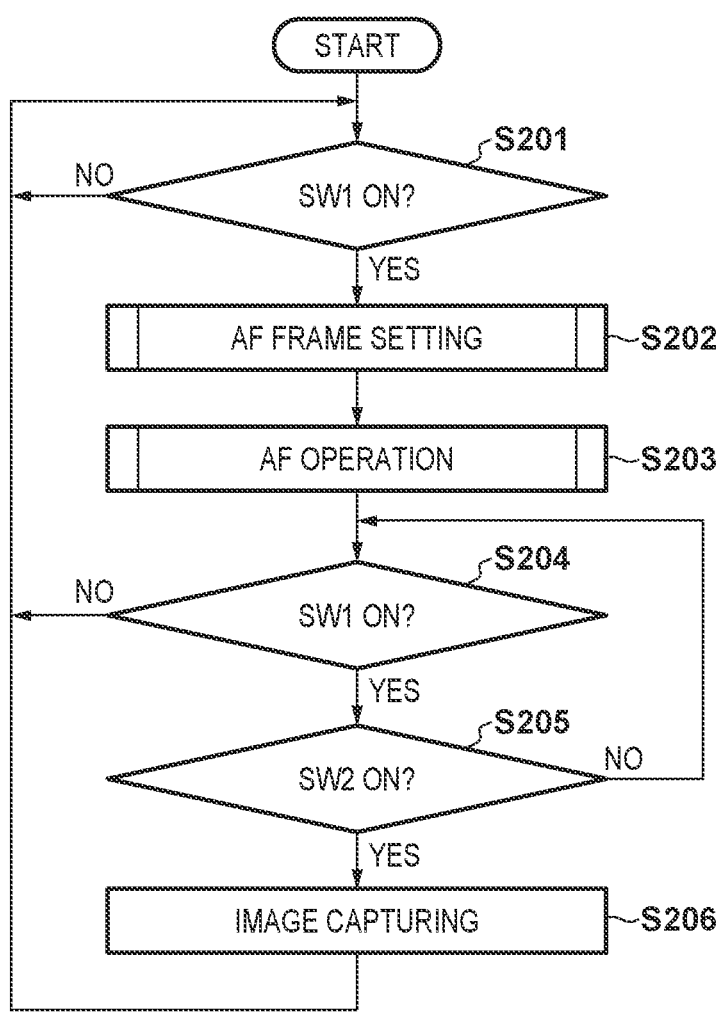
FIG. 2 is a flowchart describing an operation of a camera.

FIG. 2 is a flowchart illustrating a flow of image capturing control processing in a case where capturing of a still image is performed from a state in which a live view image is displayed. The operation of the flowchart is realized by the system control unit 209 as a computer executing a program stored in the ROM 219. The foregoing also applies to the flowchart described below.

First, at step S201, the system control unit 209 checks the state of the SW1 (217). When the SW1 (217) is ON, the system control unit 209 advances the processing to step S202, otherwise keeps waiting.

At step S202, the system control unit 209 performs AF frame setting described below to the AF signal processing unit 204.

At step S203, the system control unit 209 performs AF operation described below.

At step S204, the system control unit 209 checks the state of the SW1 (217). When the SW1 (217) is ON, the system control unit 209 advances the processing to step S205, otherwise, returns the processing to step S201.

At step S205, the system control unit 209 checks the state of the SW2 (218). When the SW2 (218) is ON, the system control unit 209 advances the processing to step S206, otherwise, returns the processing to step S204.

At step S206, the system control unit 209 performs an image capturing operation, and subsequently returns the processing to step S201.

AF Frame Setting

Figure 3:
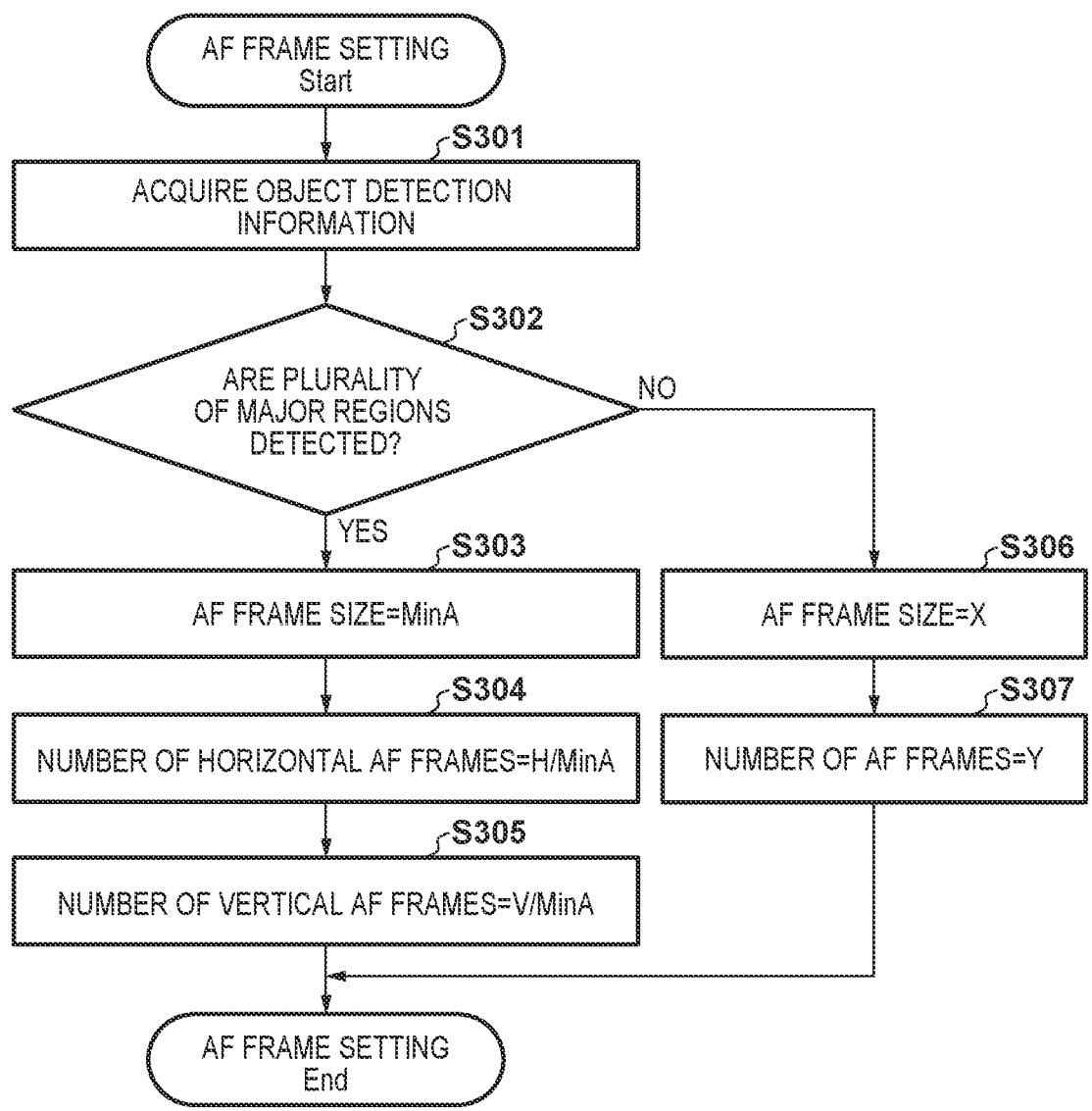
FIG. 3 is a flowchart describing an AF frame setting operation.

FIG. 3 is a flowchart describing the AF frame setting processing at step S202 in FIG. 2.

First, at step S301, the system control unit 209 acquires object detection information obtained by the object detection unit 211. In the present embodiment, detection of an object, discrimination of the type of the object such as whether the object is a person or an animal such as a dog or a wild bird, and further detection of major regions in the object are performed. Here, the major regions are a pupil, a face, or a body of a person or an animal. These detections are performed using a learning method according to well-known machine learning, recognition processing according to image processing means, or the like.

For example, there are the following types of machine learning:

(1) Support Vector Machine
(2) Convolutional Neural Network
(3) Recurrent Neural Network In addition, as an example of recognition processing, there is known a method in which a skin color region is extracted from gradation colors of each pixel represented by image data, and detection of the face is performed according to a degree of matching with a preliminarily prepared face contour plate. In addition, there is also known a method in which face detection is performed by extracting feature points of a face such as an eye, a nose, or a mouth using a well-known pattern recognition technique. Here, the method of detecting the major region applicable to the present invention is not limited to the aforementioned methods, and other methods may be used.

At step S302, the system control unit 209 determines whether or not a plurality of major regions are detected in the detection result of the object detection unit 211. The system control unit 209 advances the processing to step S303 when a plurality of images are detected, otherwise advances the processing to step S306.

Here, the concept of detection will be described, referring to FIGS. 4A and 4B, and FIGS. 5A and 5B, for a case where a single major region is detected and a case where a plurality of major regions are detected.

Figure 5A:
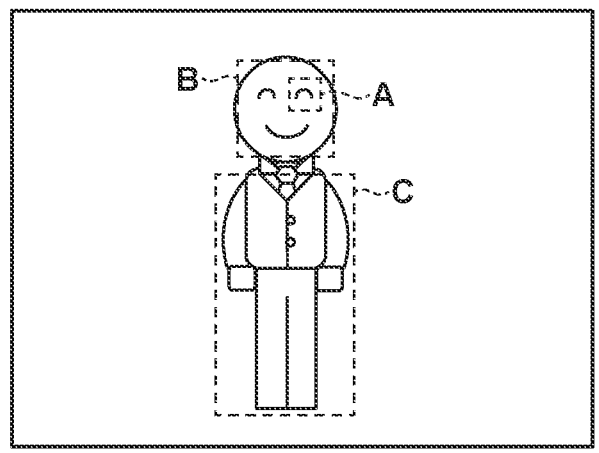
FIGS. 5A and 5B are diagrams illustrating a concept of detection regions for a person's pupil, face, and body.

FIG. 4A is a state in which only a face a is detected. FIG. 5A is a state in which a pupil A, a face B and a body C is detected. It is assumed that the type of object such as person or animal, as well as the center coordinates, the horizontal size, and the vertical size in each detected major region can be acquired from the object detection unit 211.

At step S303, the system control unit 209 inputs, to MinA, the detected minimum major region, i.e., the smaller value of the horizontal and vertical sizes of the pupil A in FIG. 5A, and sets MinA as the AF frame size.

Figure 5B:
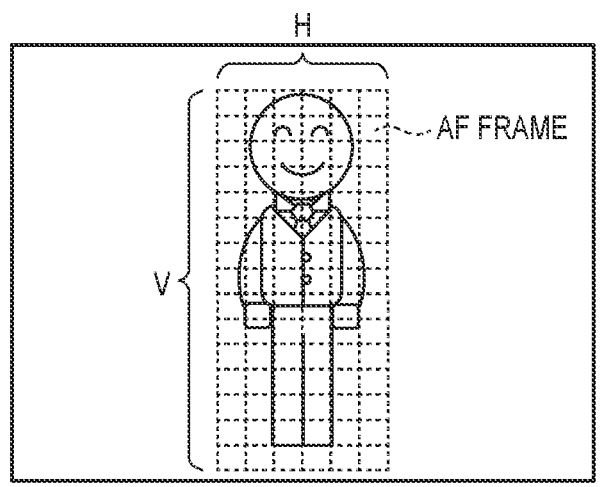

At step S304, the system control unit 209 calculates, from the horizontal coordinates and the horizontal size of each of the detected major regions, a horizontal size H in FIG. 5B covering all the major regions, and determines the number of horizontal AF frames by dividing H by the AF frame size MinA.

At step S305, the system control unit 209 calculates, from the vertical coordinates and the vertical size of each of the detected major regions, a vertical size V in FIG. 5B covering all the major regions, and determines the number of vertical AF frames by dividing V by the AF frame size MinA. And the setting of the AF frame (sub-region for detecting the focus) is terminated.

Figure 6A:
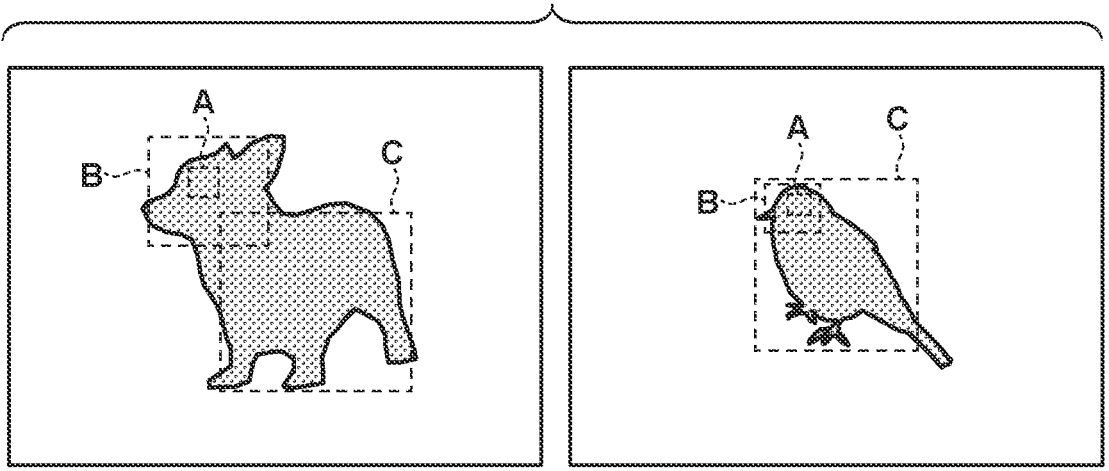
FIG. 6A is a diagram illustrating a concept of detection regions for an animal's pupil, face, and body.
Figure 6B:
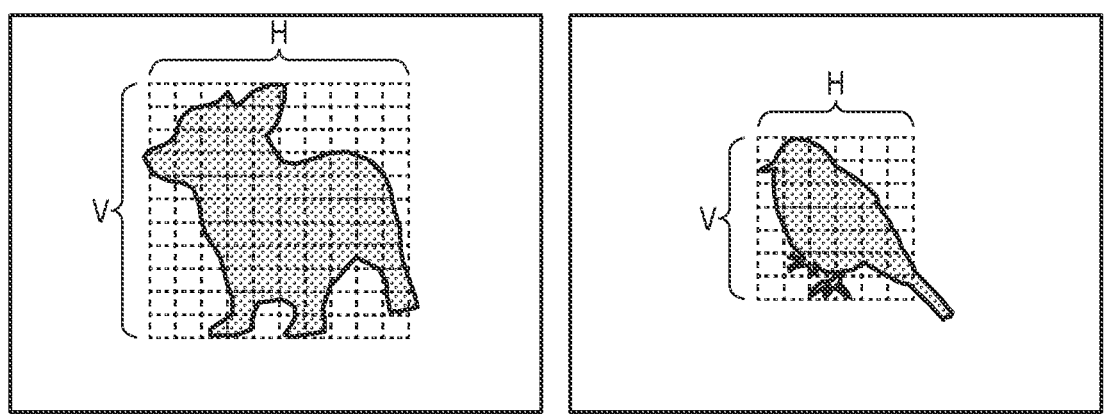
FIG. 6B is a diagram illustrating a concept of AF frame setting for an animal's pupil, face, and body.

The control flow for a case of an animal is similar to that for a case of a person, and the detection region and the concept of AF frame setting are as illustrated in FIGS. 6A and 6B, respectively. In the present embodiment, a square region with a side being the minimum size is set as the AF frame, the AF frame sizes may be different in the horizontal direction and the vertical direction, or the AF frame may be set to the number that can be calculated by the system control unit 209.

At step S306, the system control unit 209 sets an AF frame of a predetermined size X for the detected face, as illustrated in FIG. 4B. A pupil size estimated from the face may be set to the X, or a frame size may be set to the X with which an S/N is secured and a sufficient focusing performance is obtained taking into account a low illumination environment. In the present embodiment, the estimated pupil size is set to the X.

At step S307, the system control unit 209 sets an AF frame number Y such that the region of the face a can be covered with the AF frame size set at step S306 and also can cope with a case where the face moves.

AF Operation

Figure 7:
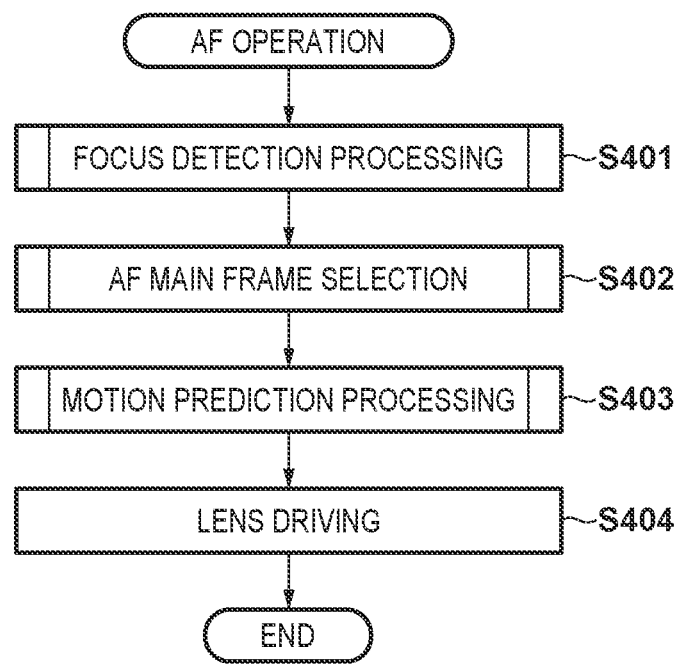
FIG. 7 is a flowchart describing an AF operation.

FIG. 7 is a flowchart describing the AF operation at step S203.

First, at step S401, the system control unit 209 performs focus detection processing in each AF frame to detect a defocus amount and reliability. The focus detection processing will be described below.

At step S402, the system control unit 209 selects an AF main frame described below using the reliability obtained at step S401.

At step S403, the system control unit 209 performs a motion prediction using the defocus amount of the AF main frame selected at step S402 and the defocus history of the AF main frame selected in the past. Details will be described referring to FIG. 11.

At step S404, the system control unit 209 performs lens driving in accordance with the prediction result calculated at step S403.

Focus Detection Processing

The focus detection processing at step S401 in FIG. 7 will be described, referring to FIG. 8.

First, at step S501, the system control unit 209 sets a focus detection region having an arbitrary range in the image data output from the image sensor 201, and advances the processing to step S502.

At step S502, the system control unit 209 acquires, from the image sensor 201, a pair of image signals (image A and image B) for focus detection corresponding to the focus detection region set at step S501.

At step S503, the system control unit 209 performs averaging processing of row signals in the vertical direction for the pair of signals acquired at step S502. The influence of noise on the image signals can be reduced by this processing.

At step S504, the system control unit 209 performs filtering processing that extracts signal components of a predetermined frequency band from the signals subjected to the averaging processing in the vertical direction at step S503.

At step S505, the system control unit 209 calculates a correlation amount from the signals obtained by performing the filtering processing at step S504.

At step S506, the system control unit 209 calculates a change amount in correlation amount from the correlation amount calculated at step S505.

At step S507, the system control unit 209 calculates an image shift amount from the change amount in correlation amount calculated at step S506.

At step S508, the system control unit 209 calculates reliability representing degree to which the image shift amount calculated at step S507 is reliable.

At step S509, the system control unit 209 converts the image shift amount to a defocus amount and terminates the focus detection processing.

AF Main Frame Selection

Figure 9A:
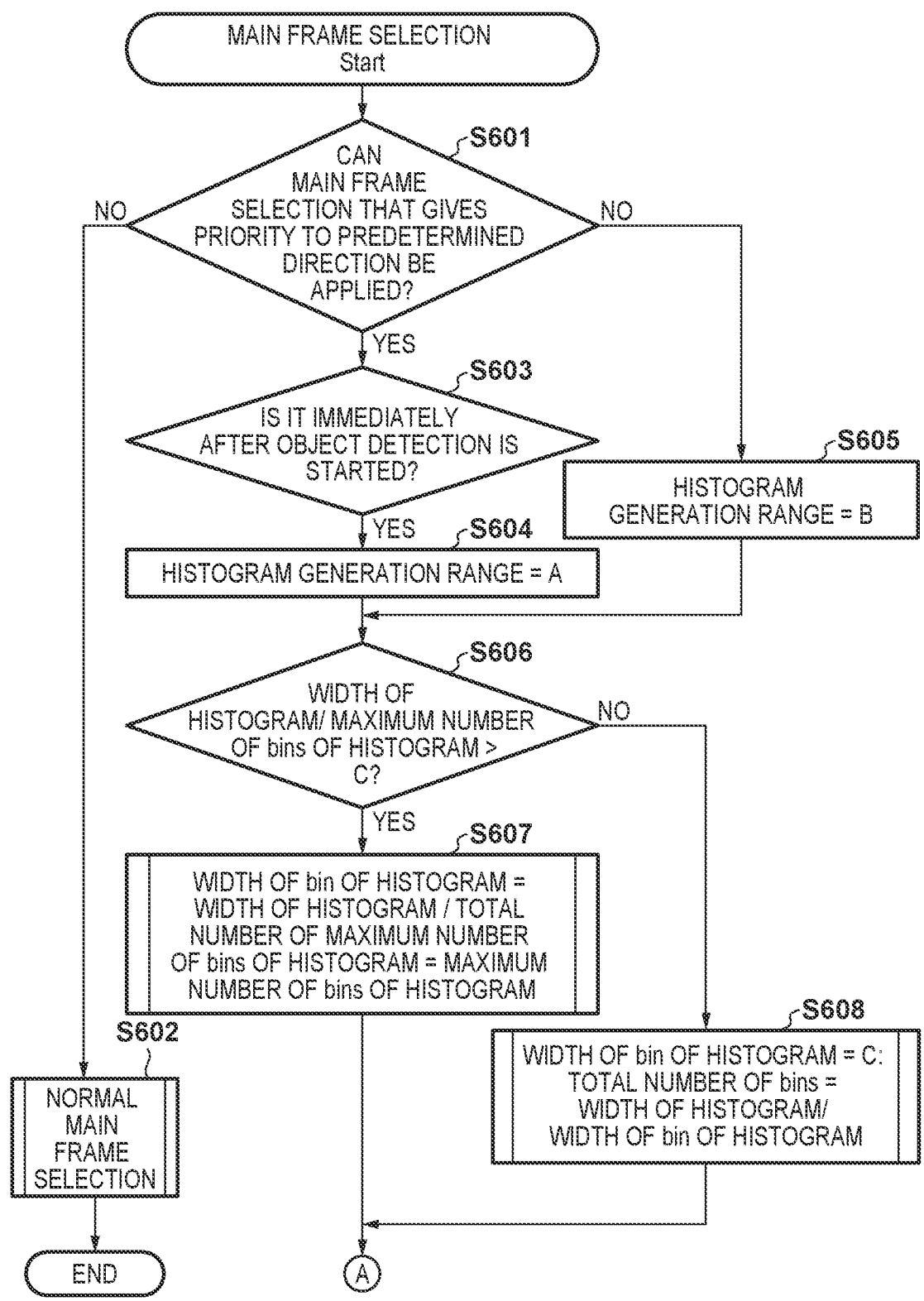
FIGS. 9A and 9B are flowcharts describing selection processing of an AF main frame.
Figure 9B:
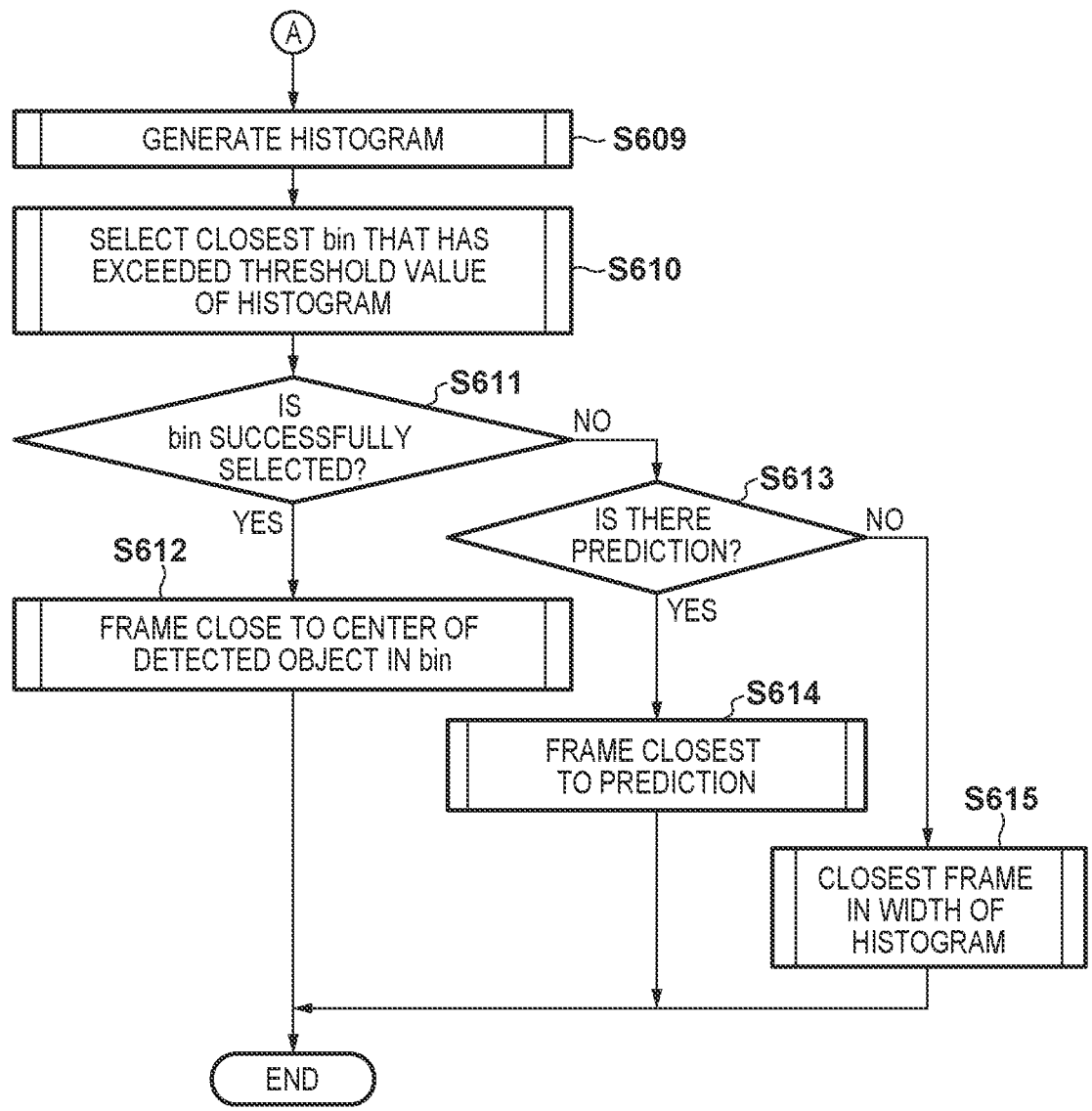

FIGS. 9A and 9B are flowcharts describing the main frame selection processing at step S402 illustrated in FIG. 7.

In the present embodiment, the processing is described taking as an example a case of focusing on a bird with a large difference in distance between near and far within the object.

The present embodiment obtains the relation between the object distance and the number of AF frames corresponding to the object distance. Specifically, a histogram is generated in which the object position (position in the depth direction, object distance) is used for the horizontal axis and the number of AF frames having a defocus result corresponding to the object position is used for the vertical axis. The concept is illustrated in FIG. 10A. The solid line indicates the position of the face of the bird, and the region surrounded by the dotted line is the AF frame. Here, the fact that the object is a bird is detected by the object detection unit 211, as has been described above.

First, at step S601, the system control unit 209 checks whether or not main frame selection that gives priority to a predetermined direction can be applied. The condition checked here is that the type is a bird, whether there is movement in the in-plane direction of the screen or the distance direction (depth direction), and the object distance is such a distance in which the focus difference within the object is not too large (the focus difference within the object is smaller than a predetermined value). This is to remove only the AF frame including background components and prevent from erroneously focusing on the wing tip. Here, whether or not there is movement of the object is determined by detecting time series change in the in-focus position of the object and predicting the in-focus position of the object, as illustrated in FIG. 11. In addition, whether or not the object distance is such distance in which the focus difference within the object is not too large is determined by detecting whether or not the object has a deep depth due to the object being located farther than a predetermined distance.

Here, when setting the entire AF frame region (AF area, in the following) by the previous frame, the AF area is likely to shift from the object in the current frame and therefore panning information of the photographer side may be included in the determination at step S601.

The system control unit 209 advances the processing to step S602 when the condition is not satisfied at step S601, or advances the processing to step S603 when the condition is satisfied.

At step S602, the system control unit 209 executes normal main frame selection. In the normal main frame selection, the AF frame closest to the center of the detected object is employed. However, when the defocus amount of the AF frame significantly deviates from the predicted value (deviated by a predetermined amount or more) at the center of the detected object, an AF frame having closer predicted value in the detected object region is employed.

At step S603, the system control unit 209 determines whether or not it is immediately after the object detection is started. When it is immediately after the object detection is started, the system control unit 209 advances the processing to step S604, otherwise advances the processing to step S605.

In step S604 and subsequent steps, a histogram is generated in which the object distance is used for the horizontal axis and the number of AF frames calculated for the defocus result within a same bin (one section) in the horizontal axis is used for the vertical axis.

At step S604, the system control unit 209 sets a histogram generation range A. At step S605, the system control unit 209 sets a histogram generation range B. In addition, the center of the histogram generation range is set to a predicted position at the current time calculated from the result of the AF frame selected in the previous frame.

Here, the relation between A and B is given as A>B. The range A is set to be wider in consideration of a case where a region different from the object (background or the like) is erroneously focused before detecting the object.

At step S606, the system control unit 209 determines whether or not a value obtained by dividing the width of the histogram generation range by the maximum number of bins is larger than C. The system control unit 209 advances the processing to step S607 when the value is larger than C, or advances the processing to step S608 when the value is equal to or smaller than C.

At step S607, the system control unit 209 sets, as a width of the bin of the histogram, a value obtained by dividing the generation width of the histogram by the maximum set number of bins. In addition, the maximum number is set as the total number of bins. The maximum number of bins is set to a number with which major regions such as a face or a pupil in the object region can be extracted with the bin width being set.

As an example, the concept when the maximum number of bins is set to 30 is illustrated in FIG. 10B. In this example, the bin width is set equal to the depth of field, and the histogram generation range is set to a depth of 30.

At step S608, the system control unit 209 sets the bin width to C. A value obtained by dividing the generation width of the histogram by the bin width is set as the total number of bins. This is to exclude the regions other than the object as much as possible not to erroneously perform focus tracking on other objects or the background, since the step S608 is a case where the object detection is continuing.

At step S609, the system control unit 209 generates a histogram based on the defocus amount of each AF frame, using the condition set at step S608 and before.

At step S610, the system control unit 209 selects, from peaks of the histogram, the closest bin that has exceeded the threshold value, in the generated histogram. In this case, a histogram threshold value or the like is set for the number of AF frames forming the peak and the bin to be selected, as illustrated in FIG. 10A. In addition, the threshold value may be varied depending on the processing, as illustrated in FIGS. 10B and 10C.

At step S611, the system control unit 209 determines whether or not a bin is successfully selected. The system control unit 209 advances the processing to step S612 when a bin is successfully selected, or advances the processing to step S613 when a bin is not successfully selected.

At step 612, the system control unit 209 selects in the bin, as the main frame, an AF frame close to the center of the object being detected. In FIG. 10A, the AF frame is indicated as the shaded portion.

At step S613, the system control unit 209 determines whether or not the in-focus position of the object is predicted. The system control unit 209 advances the processing to step S614 when the in-focus position is predicted, or advances the processing to step S615 when the in-focus position is not predicted.

At step S614, the system control unit 209 selects, as the main frame, the AF frame closest to the prediction in the detected object region.

At step S615, the system control unit 209 selects, as the main frame, the closest AF frame in the closest bin being selected. Focusing on the pupil or the face that are the main parts of the bird can be facilitated by controlling as described above.

Motion Prediction Processing

FIG. 11 illustrates a change of the image plane position in motion prediction processing. In FIG. 11, the vertical axis indicates the object image plane position obtained from the defocus amount calculated in step S401, and the horizontal axis indicates time. In addition, FIG. 11 illustrates that the distance is farther as the image plane position of the vertical axis is larger and illustrates a state where the history of the drawing indicates that the object approaching the photographer (camera) is followed.

The focusing processing is periodically performed, and T1 to T5 each indicating the time when the focusing processing is performed. The predicted driving amount is obtained, for example, by deriving a predicted curve by a collective least squares method using past image plane positions and respective focus detection time, and calculating an image plane position at future time of prediction based on the curve. In other words, the lens is driven at the time T4 to drive the lens corresponding to the defocus amount y, aiming to achieve in-focus at the time T5.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-133519, filed Aug. 24, 2022, which is hereby incorporated by reference herein in its entirety.

What is claimed is:

1. An image capturing apparatus comprising:
   at least one processor or circuit configured to function as:
   an object detection unit configured to detect an object from an image signal obtained by an image sensor;
   a discriminating unit configured to discriminate a type of the object being detected;
   a setting unit configured to set a focus detection region divided in a plurality of sub-regions corresponding to the region of the object being detected;
   a focus detection unit configured to detect information about an in-focus position for each of the plurality of sub-regions;
   a prediction unit configured to predict an in-focus position according to a movement of the object in a depth direction; and
   a selection unit configured to select an in-focus position of which sub-region among the plurality of sub-regions to employ as the in-focus position of the object, in accordance with the type of the object and the in-focus position being predicted.

2. The image capturing apparatus according to claim 1, wherein the selection unit employs, when a specific condition is not satisfied, an in-focus position of the sub-region closest to center of the region of the object being detected, as the in-focus position of the object.

3. The image capturing apparatus according to claim 2, wherein the selection unit employs, when a defocus amount of the sub-region at the center of the region of the object deviates from a predicted value by a predetermined amount or more, the in-focus position of the sub-region indicating a defocus amount close to a predicted value in the region of the object being detected, as the in-focus position of the object.

4. The image capturing apparatus according to claim 1, wherein the selection unit selects, when the type of the object and the in-focus position being predicted satisfy specific condition, an in-focus position of which sub-region among the plurality of sub-regions to employ as the in-focus position of the object, based on a histogram of the number of the plurality of sub-regions corresponding to the in-focus position.

5. The image capturing apparatus according to claim 4, wherein the selection unit employs, as the in-focus position of the object, an in-focus position of a sub-region close to center of the object in a bin in which the number of the plurality of sub-regions exceeds a threshold value based on the histogram.

6. The image capturing apparatus according to claim 4, wherein the selection unit employs, when a predicted position of the object in the depth direction is detected, the in-focus position of the sub-region close to the predicted position as the in-focus position of the object.

7. The image capturing apparatus according to claim 4, wherein the selection unit employs, when the predicted position of the object in the depth direction is not detected, an in-focus position of the sub-region indicating the in-focus position of the closest distance in the histogram, as the in-focus position of the object.

8. The image capturing apparatus according to claim 2, wherein the specific condition is a case where the object is a bird.

9. The image capturing apparatus according to claim 2, wherein the specific condition is a case where the object is moving.

10. The image capturing apparatus according to claim 2, wherein the specific condition is an object distance in which focus difference in the object is smaller than a predetermined value.

11. The image capturing apparatus according to claim 2, wherein the specific condition is a case where a photographer is panning.

12. The image capturing apparatus according to claim 1, wherein the object detection unit detects a major part of the object.

13. A method of controlling an image capturing apparatus comprising:

detecting an object from an image signal obtained by an image sensor;

discriminating a type of the object being detected;

setting a focus detection region divided in a plurality of sub-regions corresponding to the region of the object being detected;

detecting information about an in-focus position for each of the plurality of sub-regions;

predicting an in-focus position according to a movement of the object in a depth direction; and selecting an in-focus position of which sub-region among the plurality of sub-regions to employ as the in-focus position of the object, in accordance with the type of the object and the in-focus position being predicted.

14. A non-transitory computer-readable storage medium storing a program for causing a computer to execute each step of a control method of an image capturing apparatus, the method comprising:

detecting an object from an image signal obtained by an image sensor;

discriminating a type of the object being detected;

setting a focus detection region divided in a plurality of sub-regions corresponding to the region of the object being detected;

detecting information about an in-focus position for each of the plurality of sub-regions;

predicting an in-focus position according to a movement of the object in a depth direction; and selecting an in-focus position of which sub-region among the plurality of sub-regions to employ as the in-focus position of the object, in accordance with the type of the object and the in-focus position being predicted.

* * * * *